Patented Mar. 18, 1941

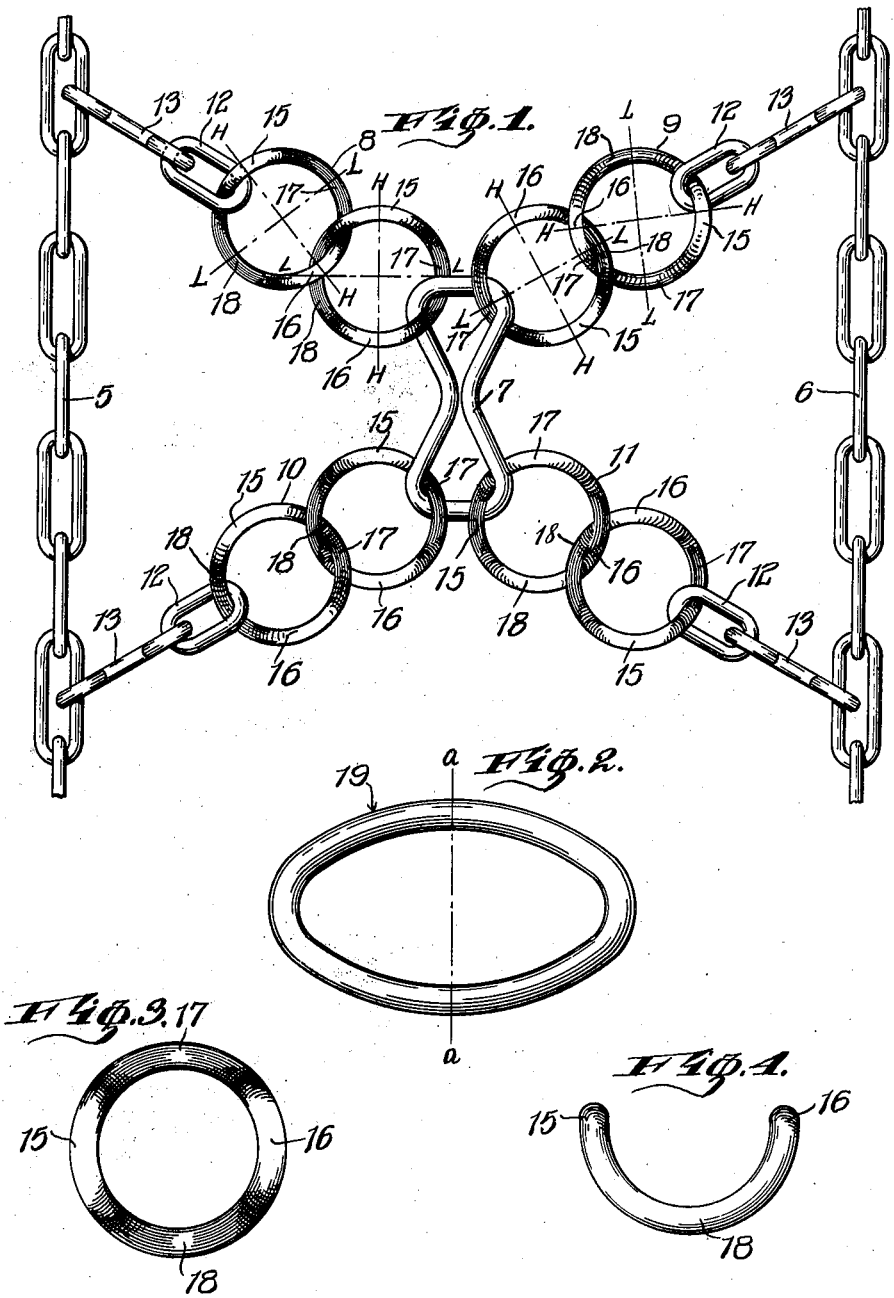

2,235,408

UNITED STATES PATENT OFFICE 2,235,408

TRACTION CHAIN

John R. Reyburn, Fairfield, Conn., assignor to American Chain & Cable Company, Inc., a corporation of New York Application October 4, 1938, Serial No. 233,213

9 Claims. (Cl. 152—243)

The present invention relates to traction chains for motor vehicles, more particularly for vehicles such as farm tractors and the like. An old type of traction device, such as mud grips or plates, had projecting flanges that dug deeply into soft mud or loose earth to provide adequate traction. In a more recent type disclosed in my U. S. Letters Patent No. 2,053,047, granted September 1, 1936, adequate traction is provided by chain sections comprising relatively high open loop-like twisted links which under great tractive effort, unless limiting means is provided, may roll to such an extent as to intertwine and shorten the cross chain causing the links to be embedded in the tire which under certain conditions may injure the tire and also reduce the amount of projection of the links from the surface of the tire thereby reducing their tractive effect. These links may also rotate about an axis normal to the plane of the link and as these links are elongated such rotation may shorten the cross chain.

One of the objects of my invention is to construct a cross chain member of links possessing the same high tractive effect as those of the patent and which are of such configuration that the cross chain is not appreciably shortened by rolling and rotational movements of the links.

Another object of this invention is the construction of a link which may be used interchangeably end and bottom for side and top to simulate in operation relatively high twisted links of opposite twists in limiting rotational movement of an adjacent link.

Other objects of this invention will appear from the following description taken in connection with the drawing, in which—

Fig. 1 is a bottom plan view of a section of a conventional type of chain showing a cross connected tread member comprising links constructed in accordance with my invention;

Fig. 2 is a plan view of a substantially elliptical flat link blank from which my improved link may be formed;

Fig. 3 is a bottom plan view of my improved form of link; and

Fig. 4 is an end view of said link.

For the purpose of disclosing my invention, I have illustrated a section of a tire chain comprising an arrangement of elements such as disclosed in the patent above referred to, but it is to be understood, of course, that the tread members may be secured upon the tire by any other means and may also take any other form. Fig. 1 shows portions of side chains 5 and 6 to which are secured H-shaped tread members comprising a central connecting tread link 7 of hour-glass shape to the four lobes of which are connected chain sections 8, 9, 10 and 11 connected by links 12 and hooks 13 to the side chains 5 and 6.

As appears from the various figures, and as the link is viewed in Figs. 3 and 4 and in chain section 8 in Fig. 1, each of the links comprises a pair of road engaging arcuate lobes or side elements 15 and 16 and a pair of tire engaging arcuate lobes or end elements 17 and 18. The link may be formed from an elliptical blank such as shown at 19 in Fig. 2 which when bent transversely about the axis a—a will produce a saddle shaped link as appears more clearly from Fig. 4. The shape and dimensions of the blank shown in Fig. 2 are such that when the blank is bent into semi-cylindrical saddle form the link so produced will be circular as viewed in plan, as shown in Fig. 3, and the distances between the points at the opposite ends of different diameters of the link will be the same and the distances between any point mid-way along the length on half of the link and any other point on the other half of the link will be substantially the same. A link so formed may be rotated about the axis normal to and the axes in the plane of the link without shortening the length of the cross chain, and either pair of lobes may in the assemblage engage the tire or road.

As disclosed in Fig. 4, I prefer to construct the link so that it will appear to be of semi-circular form in end view and side view and preferably such semi-circular outline will be of substantially the same diameter as the diameter of the link when viewed in plan as in Fig. 3. The radii of the projected outlines of the loop or lobe elements 15, 16, 17 and 18 may be the same or larger than the radius of the link as viewed in plan in Fig. 3 and links of relatively lower height than that illustrated may be produced if desired. Insofar as certain features of the invention are concerned the link shown in Fig. 4 may, as viewed from the side and end, be U-shaped to increase the amount of projection of the lobes 15 and 16.

In chain sections 8 and 9 in Fig. 1, I have indicated the high and low points of the links by lines H—H and L—L, and as appears from this figure the links may assume various rotated positions about the axes normal to the planes of the links without shortening the chain sections by substantial amounts.

I prefer to connect the inner links of each of the chain sections to the central connecting link in the relation shown in chain sections 8, 10 and 11 so that rolling movement of these links is limited in one direction, the direction in which they tend to roll under forward traction, and I also prefer to connect the outer links to the inner links in such a manner that their rotational movement in the same direction is limited by the inner links.

If desired I may first assemble the links of each of the chain sections including the links 12 and 13 as in chain section 8 and in the case of a central connecting link having the medial portions of its strands sufficiently spaced, I may connect the inner link of each chain section in the relation to the link 7 shown in chain section 8. One chain section may be slid into the position of chain section 9 where the links will be disposed as shown. By rotating the links about their axis normal to the plane and axes in the plane of the links, I may obtain the relation shown in chain section 11 in which the rotational movement of the inner link is prevented by the center link 7 and that of the outer link by the inner link, with the various lobes in the positions indicated. In the case of the inner link the tire engaging lobes 17 and 18 are now the road engaging lobes either of which may be in the forward position. The outer link may have either of its road engaging lobes in the forward position. Having so arranged the links this chain section may be moved into the position of chain section 11. Chain section 10 is merely chain section 8 slid into the position of chain section 10. Or I may in the case of the hour glass central connecting link directly connect chain section 10 as shown and slide it into the position of chain section 11 and by rotation of the links as before make the links assume the relation shown in chain section 11.

If for any structural or functional reasons it is desired to use the lobes 15 and 16 as road engaging lobes in all cases, then I may assemble chain sections 8 and 10 as described, and for chain sections 9 and 11 I may assemble the links as disclosed in chain section 11 with the inner link having its lobes 15 and 16 extending upwardly in this figure. In this construction the rotation of the inner link is limited by link 7 and that of the outer link by the inner link. Such relation is not absolutely necessary and I may connect the links in any manner and obtain the same length chain sections and effective traction.

As long as the links are connected to other links at diametrically opposite points, the length of the cross chain sections will remain substantially the same whether such connections occur at the low, high or intermediate points of the links. As the links are of circular form as viewed in plan, the chain sections will not be shortened any appreciable amount by relative rotational movement of adjacent links. As is now apparent, the links of my invention may be connected together and to the central connecting link in any relation and may then be rotated and rolled to assume the relation to each other and the central connecting link shown in chain sections 8, 10 and 11 in which rotational movement of the inner links in the same direction is limited and in which the inner links limit rotational movement of the outer links in the same direction.

While I have disclosed but one embodiment of the invention, it is to be understood that I reserve the right to make such changes as fall within the principles of my invention and of the scope of the claims hereto appended.

I claim:

1. A chain link for tire chains consisting of a closed loop of metallic wire of substantially saddle-like form with arcuate side elements and arcuate end elements, all of said arcuate elements being of substantially the same radius and said link when viewed in plan having the projected outline of a circle.

2. A chain link for tire chains consisting of a closed loop having when viewed in plan the projected outline of a circle and when viewed from the sides and ends the projected outlines of parts of circles no greater than a semi-circle.

3. A chain link for tire chains consisting of a closed loop having when viewed in plan the projected outline of a circle and when viewed from the sides and ends the projected outline of a semi-circle of the same radius as that of said circle.

4. A chain link for tire chains consisting of a closed loop having when viewed from the ends the projected outlines of parts of circles no greater than a semi-circle and when viewed in plan the projected outline of a circle.

5. A chain link for tire chains consisting of a closed loop having when viewed in plan the projected outline of a circle and when viewed from the sides and ends in directions at right angles to each other, the projected outlines of a semi-circle of the same radius as that of said circle.

6. A chain link for tire chains consisting of a closed loop having when viewed in plan the projected outline of a circle and when viewed from the sides and ends in directions at right angles to each other, the projected outlines of parts of circles no greater than a semi-circle.

7. A chain link for tire chains consisting of a closed loop having when viewed in the plan the projected outline of a circle and provided with oppositely projecting pairs of lobes of the same shape and dimensions and of many times greater height than the cross sectional dimension of the stock of which the link is made and whereby either pair of lobes may be used as tire or as road engaging lobes.

8. A tire chain comprising cross tread means each consisting of transversely extending chain sections and a central connecting link, the links constituting said chain sections being of identical construction each comprising pairs of tire and road engaging lobes and having when viewed in plan the projected outline of a circle and when viewed from the ends and sides the projected outline of semi-circles of the same radius as said circle, the inner ends of the inner links of the chain sections passing through the central connecting link in planes arranged at an acute angle with the main plane of the central connecting link to limit rotational movement of the inner links in the same direction, and the outer links having their inner ends extending in planes making an acute angle with the main planes of the inner links to limit rotational movement of said outer links in the same direction.

9. A tire chain comprising cross tread means each consisting of transversely extending chain sections and a central connecting link, the links constituting said chain sections being of identical construction each comprising pairs of tire and road engaging lobes and having when viewed in plan the projected outline of a circle and when viewed from the ends and sides arcuate outlines of at least as great a width as height, the central connecting link comprising lobes with which the inner ends of the inner links are diagonally related to limit rotational movement of the inner links in the same direction, and the outer links having their inner ends diagonally related to the outer ends of the inner links to limit rotational movement of said outer links in the said same direction.

JOHN R. REYBURN.